3,202,844
ENERGY CONVERSION APPARATUS
James E. Hatch, deceased, late of Parma Heights, Ohio, by Marguerite L. Hatch, executrix, Parma Heights, Ohio, assignor to the United States of America as represented by the Administrator of the National Aeronautics and Space Administration
Filed Nov. 8, 1961, Ser. No. 151,598
7 Claims. (Cl. 310—4)
(Granted under Title 35, U.S. Code (1952), sec. 266)

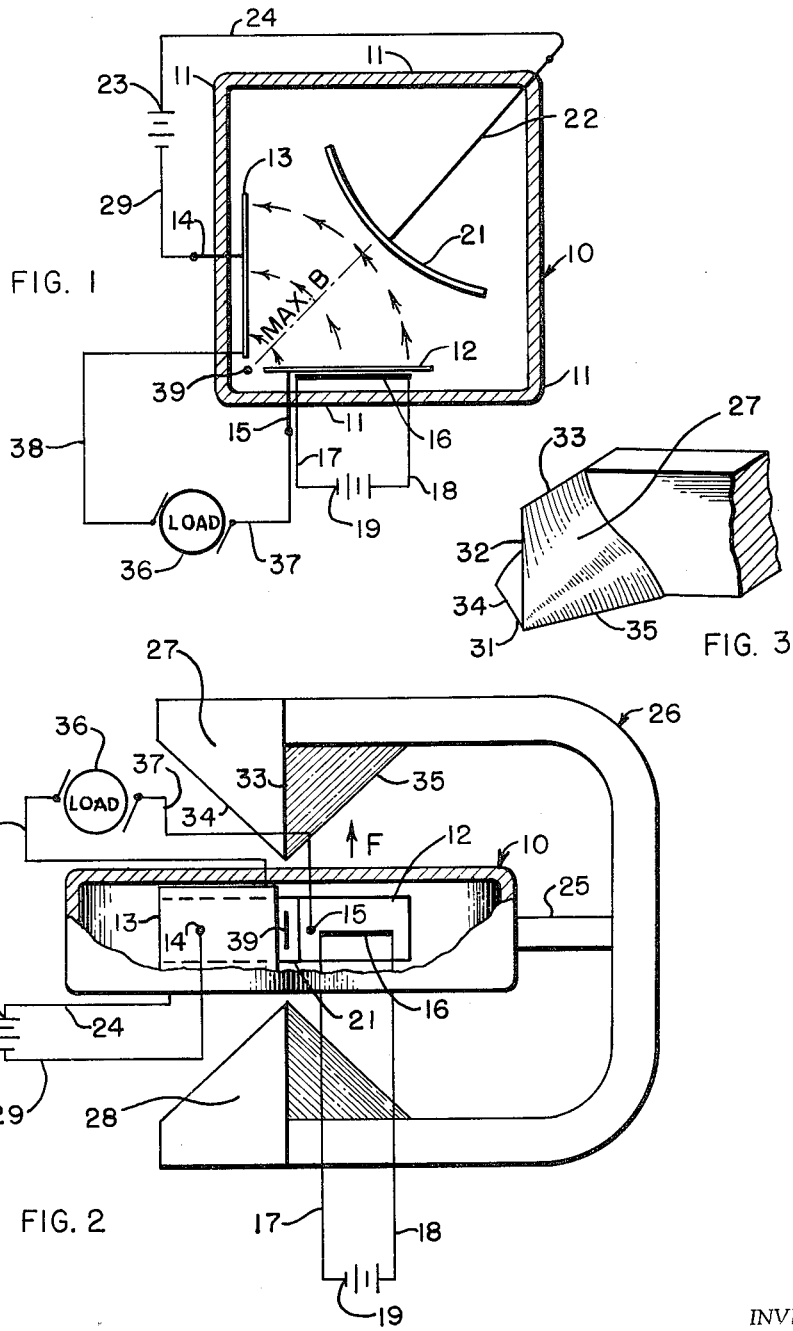

The invention described herein may be manufactured and used by or for the Government of the United States of America for governmental purposes without the payment of any royalties thereon or therefor.

This invention relates to an apparatus for directly converting thermal energy into electrical energy and, more particularly, to such an apparatus which utilizes crossed electrical and magnetic fields.

Devices which provide for direct conversion of heat into electrical energy offer many advantages over the usual approach which necessarily involves an intermediate conversion of heat into mechanical energy. For example, mechanical moving parts may be eliminated, thereby permitting maintenance-free operation. Additionally, these devices may be scaled up or down in size to any power level that may be required and can be adapted to utilize any source of heat ranging from the combustion of coal, for example, to a nuclear reactor.

One type of apparatus for providing long life direct conversion of heat to energy is the well known thermionic converter. Theoretically, a thermionic converter is capable of delivering high power densities to a load with reasonable efficiency. However, in practice, the power delivered to a load is significantly limited because of the space charge in the interelectrode spacing. A thermionic converter for minimizing space charge is the close-spaced diode. However, in order to obtain appreciable average-current density, the spacing between the cathode and anode must be less than one thousandth of an inch. This obviously presents mechanical problems and the interchange of radiant heat between the cathode and anode may be high. Such an interchange of radiant heat is undesirable because in order to obtain high-power density, the cathode must be operated at a sufficiently high temperature to emit a rather high current density and the anode must be kept sufficiently cool so that back emission is small.

Another direct energy conversion device is the magnetic triode which operates in a vacuum and which utilizes crossed electric and magnetic fields to control the detrimental effects of space charge. In a magnetic triode, electrons emitted from an emitter are accelerated toward an accelerating plate by an electric field. However, as the electrons gain velocity a magnetic field acts upon them, thereby deflecting their paths so that they follow an elongated cycloidal path to a collector surface. Because of the cycloidal electron paths there are collisions between electrons and other electrons and a resultant significant reduction in magnetic triode efficiency.

Accordingly, one object of this invention is to provide an apparatus for direct conversion of thermal energy to electricity without moving parts.

Another object of this invention is to provide a direct energy conversion apparatus having non-colliding electron flow paths.

Still another object of the present invention is to provide an apparatus having maintenance-free operation.

A further object of the instant invention is to provide for a minimum of radiant heat interchange.

A still further object of this invention is to provide an apparatus, which is simple in construction and operation, and which will operate efficiently and economically to produce useful power.

According to the present operation, the foregoing and other objects are obtained by heating an electron-emissive plate contained in spaced relationship to an electron collector plate. Electrons which are removed from the electron-emissive plate by heating thereof are accelerated towards an accelerator grid by an electric field established between the plates and grid. A shaped magnet provides a unidirectional nonuniform magnetic field at right angles to the electric field causing the electrons to follow non-colliding circular paths between the electron-emissive plate and electron collector plate.

A more complete appreciation of the invention and many of the attendant advantages thereof will be readily apparent as the same becomes understood by reference to the following detailed description when considered in connection with the accompanying drawing wherein:

FIG. 1 is a top plan view, partly in section, of the electron generating tube.

FIG. 2 is a view of one embodiment of the invention with part of the electron-generating tube in section.

FIG. 3 is a perspective view of one of the magnet poles.

Referring now to the drawing wherein like reference numerals designate identical or corresponding parts throughout the several views, and more particularly to FIG. 1, there are disclosed a triode tube 10 having generally square sides 11 and an electron-emissive plate or cathode 12 and electron collector plate or anode 13 disposed therein at a 90° angle to plate 12. The anode 13 and cathode 12 are maintained in spaced relationship by electrical conductor supports 14 and 15 respectively secured thereto and passing through the tube sides 11. The cathode 12 is heated by any means to raise the temperature thereof to a desired temperature to produce electron-emission. As shown, a wire resistance heater 16 provides for radiant heating. Conductors 17 and 18 interconnect the heater with a source of energy 19. Any electron-emissive material, such as for example tungsten impregnated with barium and calcium salts, can be used for the anode 13 or cathode 12 in practicing the invention. The operating temperature of the cathode 12 is to be commensurate with the choice of material utilized and it is preferred that the anode temperature be maintained at a low value.

An arc-like accelerating grid 21 is disposed in the tube 10 with the convex curvature facing the right angle configuration of the cathode and anode. The arc of the grid 21 follows an equipotential line with the ends thereof on electric flux lines that terminate at the outer extremities of the cathode 12 and anode 13. The grid 21 may be fabricated of any suitable nonmagnetic metal, such as, for example, copper or silver. The grid 21 is maintained in spaced relationship to the anode 13 and cathode 12 by a support 22 passing through the tube wall 11. The support also acts as an electrical conductor.

A positive potential is impressed upon the grid 21, for example, by a battery 23 which is electrically connected to the grid 21 and anode 13 by conductors 24 and 29, thus providing for an electrostatic field in the zone between the accelerating grid 21, anode 13 and cathode 12.

In operation the tube 10 is secured by a bracket 25 between the arms of a magnet 26, the poles of which are identified by 27 and 28 as better seen in FIG. 2, which poles provide for a unidirectional nonuniform field strength at substantially right angles to the electric field across the tube. The tube 10 of FIG. 1 has been rotated ninety degrees for proper positioning in the magnet, as shown. A reference point 39 is indicated in the tube 10 in FIG. 1 and FIG. 2 for ease of geometric identification. The point 39 serves no function as a part of structure or operation of the invention. As can better be seen in FIG. 2, the cathode 12 is slightly smaller than the anode 13 to allow for slight misalignment of the magnetic and electric fields. The magnet poles provide a field having a maximum magnetic flux density, B, angularly midway between the cathode 12 and anode 13, as shown in FIG. 1 and falling off to zero on either side of the maximum flux value at the plane of the cathode 12 and at the plane of the anode 13.

Electrons are emitted by the cathode 12 by heating thereof. These electrons are accelerated toward the grid 21 by virtue of the electrostatic field present in the zone between the grid 21, cathode 12 and anode 13, as hereinbefore discussed. As the electrons gain velocity, the nonuniform magnetic field acts on them to deflect their movement into concentric or circular paths, having as a center the reference point 39, as shown in FIG. 1. Electrons are accelerated by the grid 21 to the radial line of maximum magnetic field flux density. For the remainder of the electrons' circular path, the grid acts as a decelerator. The electrons arrive at the surface of the anode 13 with virtually the same energy they had when they left the cathode 12.

The magnet pole shape to produce the nonuniform magnet may be better seen with respect to FIG. 3 wherein is shown the pole 27 of magnet 26. The pole 27 may be likened to the bow or keel of a ship having a flat top wedge surface 31, a front edge 32 and a bottom edge 33. A magnet having substantially the same shape poles will produce a magnetic field over a 90° angle varying from substantially zero field flux at the top wedge surface edges 34 and 35 and maximum field flux strength along the line formed by the bottom edge 33. The tube 10 is secured between the magnet poles in such attitude that maximum field flux line, B, gausses, falls on the radial angular midline between the cathode 12 and anode 13 and the substantially zero field lines fall along the cathode 12 and anode 13 planes.

During operation, a load 36 is placed in circuit with the cathode 12 and anode 13 plates through conductors 37 and 38, which conductors extend through the tube sides 11 and make suitable contact with these plates. In order to minimize electron collision with residual gas molecules, the tube 10 is evacuated to a high vacuum and accordingly all conductors and support members passing through the tube sides 11 are to be appropriately sealed to maintain the vacuum. The tube 10 may be of any suitable material which will permit a magnetic field to pass therethrough. Additionally, all electrical conductors passing through the tube sides 11 are to be suitably electrically insulated therefrom.

Alternative embodiments of the invention are possible. For example, the angle between the anode and the cathode may be less or greater than 90°. Use of an angle approaching 180 degrees would minimize the radiant heat interchange between the cathode and anode, thereby reducing the amount of heat to be radiated from the anode to keep it cool. The magnet utilized may be of the permanent type, as shown, or of the electromagnetic type. Higher efficiency would result with the permanent type because no electrical power is expended therewith in establishing magnetic field, as required with an electromagnet.

Obviously, many modifications and variations of the present invention are possible in the light of the above teachings. It is, therefore, to be understood that within the scope of the appended claims the invention may be practiced other than as specifically described.

What is claimed is:
1. Direct energy conversion apparatus comprising
a housing sealed and evacuated to a high vacuum,
an electron-emissive plate disposed in said housing,
an electron collector plate disposed in said housing at substantially a 90-degree angle from said electron-emissive plate,
an arcuate accelerator grid disposed in said housing, said grid facing the substantially 90-degre angle formed by said emissive plate and said collector plate,
means for heating said electron-emissive plate,
an energy source connected to said grid and said collector plate, and
a magnet secured to said housing, said magnet having poles shaped as a wedge, said wedge having a flat triangle bottom surface, a substantially narrow upper surface, and a substantially narrow front edge, said poles providing for a unidirectional non-uniform magnetic field substantially normal to the electrostatic field, the magnetic field flux having values approaching zero near said electron-emissive plate and said electron collector plate and reaching a maximum in substantially a 45-degree line between said electron-emissive plate and said electron collector plate.

2. Direct energy conversion apparatus comprising
a housing sealed and evacuated to a high vacuum,
an electron-emissive plate disposed in said housing,
an electron collector plate disposed in said housing in spaced relationship to said electron-emissive plate,
an accelerator grid disposed in said housing, said grid being exposed to said emissive plate and said collector plate,
means for heating said emissive plate,
an energy source connected to said grid and said collector plate to create an electrostatic field in a zone between said grid and said plates, and
a magnet secured to said housing, the poles of said magnet providing for a unidirectional nonuniform magnetic field substantially normal to the electrostatic field, said poles being shaped to provide a nonuniform magnetic field flux having a maximum value angularly midway between said plates and a minimum value substantially lower than the maximum value near said plates.

3. Direct energy conversion apparatus comprising
an electron-emissive surface,
means for heating said emissive surface,
an electron collector surface positioned to receive electrons from said emissive surface,
means for subjecting said surfaces to an electrostatic field, and
a magnet secured to said housing, the poles of said magnet being positioned to provide a unidirectional magnetic field substantially normal to the electrostatic field, said poles being shaped to provide a nonuniform magnetic field flux having a maximum value angularly midway between said surfaces and a minimum value substantially lower than the maximum value near said surfaces.

4. Apparatus, according to claim 3, wherein the electron flow occurs in a housing under a high vacuum.

5. Direct energy conversion apparatus comprising
an electron-emissive plate,
means for heating said electron-emissive plate,
an electron collecting plate positioned to receive electrons emitted from said electron-emissive plate,
means for subjecting the flow of electrons from said emissive plate to said collector plate to an electrostatic field, and
means for subjecting the flow of electrons to a unidirectional nonuniform magnetic field, substantially normal to said electrostatic field, the field having the characteristics of a maximum value angularly midway between said plates and a minimum value substantially lower than the maximum value near said plates.

6. Apparatus, according to claim 5, wherein the electron flow occurs in a housing under a high vacuum.

7. Direct energy conversion apparatus comprising
an evacuated housing,
an electron-emissive plate mounted in said housing, an electron collector plate mounted in said housing in a plane angularly disposed with respect to the plane of the electron-emissive plate about a reference axis disposed between said plates, an accelerator grid mounted in said housing and disposed in a general plane normal to a plane passing through said reference axis and bisecting the angle included between said plates, means for heating said electron-emissive plate, a source of electric potential connected between said grid and one of said plates to create an electrostatic field in the zone between said grid and said plates, and a magnet having poles, shaped and arranged to create an unidirectional, non-uniform magnetic field through said zone substantially normal to said electrostatic field; the flux density in said magnetic field being maximum along said bisecting plane and substantially lower than the maximum adjacent said plates.

References Cited by the Examiner

UNITED STATES PATENTS

| | | | |
|---|---|---|---|
| 2,680,823 | 6/54 | Dohler | 313—156 X |
| 3,041,481 | 6/62 | Peters | 310—4 |

ORIS L. RADER, *Primary Examiner.*

DAVID X. SLINEY, *Examiner.*